Sept. 11, 1923.
H. C. GRAYBILL
ANTISKID DEVICE
Filed Oct. 1, 1920
1,467,579
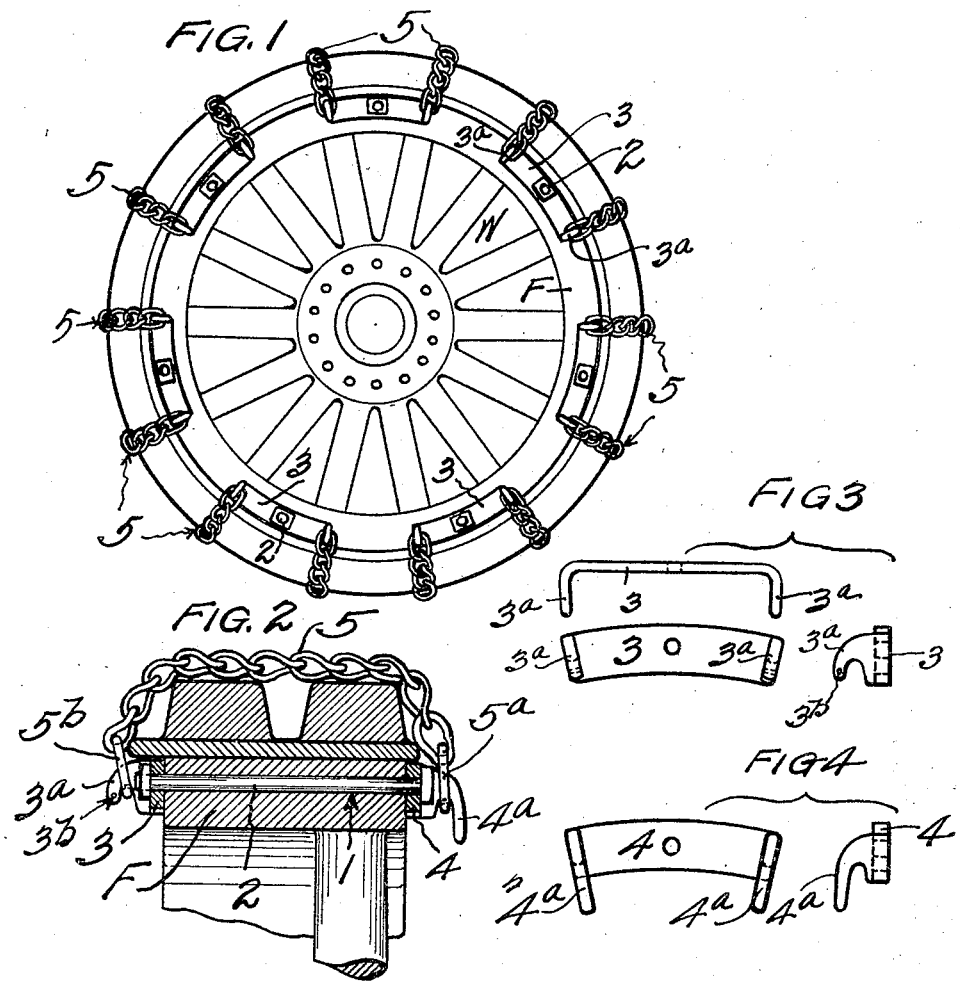
Inventor
HENRY C. GRAYBILL
By N. E. Gee
Attorney Patented Sept. 11, 1923.

1,467,579

UNITED STATES PATENT OFFICE.

HENRY C. GRAYBILL, OF ALTOONA, PENNSYLVANIA.

ANTISKID DEVICE.

Application filed October 1, 1920. Serial No. 413,954.

*To all whom it may concern:*

Be it known that I, HENRY C. GRAYBILL, citizen of the United States, residing at Altoona, in the county of Blair and State of Pennsylvania, have invented new and useful Improvements in Antiskid Devices, of which the following is a specification.

This invention relates to anti-skid devices for truck wheels.

A primary object is to provide an improved anti-skid chain and fastening which dispenses with the usual side chain and enables truck operators to quickly assemble the chain on the wheel.

A further object of this invention is to provide a chain fastening means on the wheel which is not only out of the way when not in use, but one that will withstand the rough usage to which automobile trucks are usually subjected.

A still further object of this device is to provide ample locking means to hold the chain when once it is assembled on the truck wheel.

With the above and other objects in view which will be more readily apparent as the nature of the invention is better understood the same consists in the novel construction, combination and arrangement of parts hereinafter more fully pointed out, illustrated and claimed.

It will be readily apparent to those skilled in the art to which this invention relates that the same is susceptible of structural changes or modification without departing from the spirit or scope of the invention, but a preferred and thoroughly practical embodiment of the invention is shown in the accompanying drawings, in which:—

Figure 1 is a side elevation of a truck wheel having my improved chains and chain fasteners applied thereto.

Figure 2 is a cross section of the truck wheel shown in Figure 1 and illustrates the manner in which the chain is applied over the tire tread.

Figure 3 is a composite view showing a plan, side elevation and end elevation of the chain fastening means adapted to be applied to the outside of the truck wheel.

Figure 4 is a view similar to Figure 3 showing a side elevation and an end elevation of the chain fastening means adapted to be applied to the inside of the wheel.

Like reference numerals refer to corresponding parts throughout the several figures of the drawings.

The present invention aims particularly to provide an anti-skid unit which may be used in any desired multiple, and easily and quickly applied to any vehicle wheel now in use. In this connection the invention is of particular advantage in connection with truck wheels of the solid tire type, although it may be conveniently used in connection with other types. By reason of the particular construction of the anti-skid unit it may be applied with convenience to a truck wheel which is stalled in mud or the like where it would be otherwise impossible to apply an anti-skid chain over the entire circumference of the wheel.

Referring particularly to the novel features of construction it will be observed from the drawing that the felly F of the wheel W is preferably provided with a plurality of transverse openings 1 to receive the fastening or tie-bolt 2 for coupling or connecting the chain locking or attaching plates 3 and 4 respectively.

The said plates 3 and 4 are preferably of arc shape formation and are of a length corresponding to substantially the arc between two adjacent spokes as shown in the drawings thereby conforming to the shape of the felly and rim, and are held securely in position on opposite sides of the felly by means of the fastening bolt 2. One of the plates, namely, 3, is provided at each end with the hook elements $3^a$ having at their outer ends openings $3^b$ for receiving a cotter pin or equivalent retaining key. The other plate, 4, is formed with somewhat similar retaining hooks $4^a$ but as will be observed from the drawings the said hooks $4^a$ are relatively long as compared with the hooks $3^a$ to facilitate the holding of the cross chain 5 in position. That is to say one of the attaching plates is provided with holding hooks of greater length than the other so that the eye or ring $5^a$ for instance of the chain 5 may be first placed over the hook $4^a$, then across the tread of the tire on the wheel so that the other terminal ring or eye $5^b$ of the chain may be fitted over the relatively short hook $3^a$. This arrangement provides means for compensating for any slack that may exist in the chain 5 either at the time of application or as a result of tire wear during service and effectively holds the cross chains in place. However, as a further safeguard in connection with the short hooks 3ª, the suitable transverse key elements may be passed through the opening 3ᵇ to provide the additional locking effect. The inside chain hook 4ª serves to throw the broken chain out of the way to prevent it from striking the fender as broken chains usually do.

From the foregoing it will be apparent that the present device includes a pair of holding or attaching plates which are secured in position by a common tie bolt, and have at their opposite end portions suitable inturned hooks for receiving the cross chains 5 which are preferably paired in each unit. As will be apparent from Figure 1 any desired number of units may be placed about the felly of the wheel, but in usual practice it has been found that seven units have proved practical and sufficient to produce the most effective results.

Without further description it is thought that the many features and advantages of the invention will be readily apparent, and it will of course be understood that changes in the form, proportion and minor details of construction may be resorted to without departing from the spirit of the invention or scope of the appended claim.

I claim:—

An anti-skid unit for vehicle wheels, including in combination with the wheel felly inner and outer chain attaching plates of a length corresponding to substantially the arc between two adjacent spokes and positioned at opposite sides of the felly, one of said plates having long hooks at opposite ends thereof, and the other plate having short hooks providing chain seats and having openings to receive cotter-keys for holding the chains in the seats, a bolt passing through the felly and clamping the plates thereto, and tread chains having the end rings thereof engaging with the long hooks and the short hooks of the opposite attaching plates.

In testimony whereof I hereunto affix my signature in the presence of two witnesses.

HENRY C. GRAYBILL.

Witnesses:
N. E. GEE,
EMORY L. GROFF.